Aug. 12, 1924.

L. DORFMAN

CURRENT TRANSFORMER

Filed Nov. 28, 1919

1,504,611

WITNESSES:
J. B. Merrill
A. A. Brand

INVENTOR
Leo. Dorfman
BY
Wesley J. Carr
ATTORNEY

Patented Aug. 12, 1924.

1,504,611

UNITED STATES PATENT OFFICE.

LEO DORFMAN, OF WILKINSBURG, PENNSYLVANIA, ASSIGNOR TO WESTINGHOUSE ELECTRIC & MANUFACTURING COMPANY, A CORPORATION OF PENNSYLVANIA.

CURRENT TRANSFORMER.

Application filed November 28, 1919. Serial No. 341,271.

*To all whom it may concern:*

Be it known that I, LEO DORFMAN, a citizen of the United States, and a resident of Wilkinsburg, in the county of Allegheny and State of Pennsylvania, have invented a new and useful Improvement in Current Transformers, of which the following is a specification.

My invention relates to transformers and it has particular relation to current transformers of the type wherein a primary winding is connected in series with the line while a very small load is derived from the secondary coils.

One object of my invention is to so construct a transformer of the above character that the necessity for the employment of correction curves in connection with associated measuring instruments, in order to correct for ratio and phase-angle differences in the currents, as the load varies, is eliminated.

Figure 2:
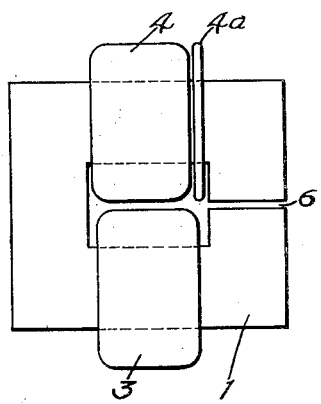
Figure 1:
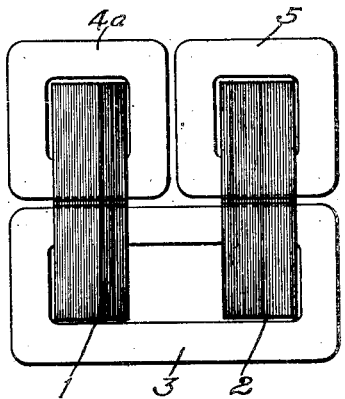
Figure 3:
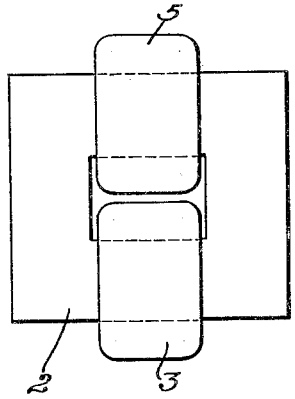
Figure 4:
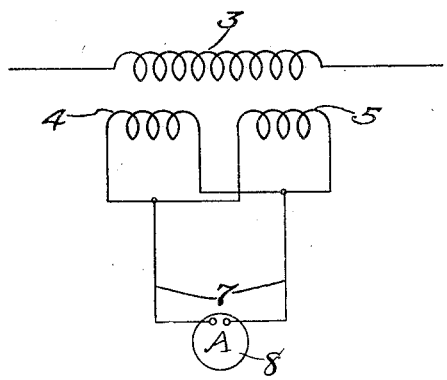
Figure 5:
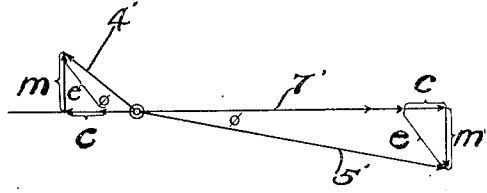

In the accompanying drawing, Figure 1 is an elevational view of cores and coils as employed in a transformer constructed in accordance with my invention; Figs. 2 and 3 are elevational views of the two ends of the structure of Fig. 1; Fig. 4 illustrates the circuit connections of the coils of the transformer shown in Fig. 1, and Fig. 5 is a vectorial representation of the current relations obtaining in a transformer of the character described.

Heretofore, in the utilization of current transformers, in connection with measuring instruments, it has been necessary to correct the instrument readings for the ratio and phase-angle differences of the primary and secondary currents, and it was necessary, therefore, to always have at hand a correctly calibrated curve sheet in order to satisfactorily utilize a transformer of the character described. I propose to eliminate the necessity for this constant correction and the use of a curve sheet, as will be set forth in detail hereinafter.

Referring now more particularly to Figs. 1, 2 and 3, core members 1 and 2 are shown as embraced by a primary coil 3, main oppositely-connected secondary coils 4 and 5 and an auxiliary, short-circuited, secondary coil 4a. It will be noted that the primary coil 3 embraces both the core members, whereas each of the main secondary coils 4 and 5 embrace but one of the core members, the auxiliary coil 4a embracing the same core member as the main secondary coil 4, for the purposes to be hereinafter described.

Furthermore, the core members are spaced sufficiently far apart to ensure that no energy interchange from magnetic leakage can occur therebetween and thus effect the accuracy of the transformation ratio.

As indicated in Figs. 2 and 3, the reluctances of the magnetic circuits through the two core members differ, this being indicated, for purposes of convenience only, by showing an air gap 6 in the core member 1.

The operation of a transformer constructed as above described will now be set forth in connection with Figs. 4 and 5, the former figure illustrating merely the circuit connections of the primary and secondary coils, it being noted that the two main secondary coils are connected in opposition. Therefore, the current which is ultimately derived from the two coils will be of a value proportional to the difference between the two component currents which are in phase with the secondary voltage. Accordingly, the value of the current traversing the primary circuit may be measured by a circuit comprising conductors 7 and an ammeter 8.

Referring now to Fig. 5, the value and vector positions of the currents in the secondary coils 4 and 5 are indicated by corresponding numerals, it being understood that the currents flowing therein are maintained unequal through the adjustment of the impedance thereof.

In transformers of the character heretofore employed and assuming that two oppositely-connected secondary coils are embodied therein, the two currents 4' and 5' would be in alinement; that is, the phase angles of the two secondary currents would be equal to each other if the reluctances of the magnetic circuits embraced by the two coils were the same. In my transformer, however, the reluctance of one of the magnetic circuits—in this instance, that circuit which is embraced by the secondary coil 4—is increased by providing an air gap 6 in the magnetic circuit. This increased reluctance causes an increase in the phase angle of the current 4', and the vectorial position of that current is, therefore, as shown in Fig. 5. The relative reluctances of the two circuits are so adjusted that the magnetizing currents, represented in Fig. 5 by the vectors $m$, are equal to each other.

It is further necessary that the core-loss components of the exciting currents in the two secondary windings shall be the same; that is, the values obtained by the vectorial addition of the magnetizing component current and the core-loss-component current in each of the two windings, must be equal, and, moreover, must have the same phase position. This condition will not exist inherently and it is, therefore, necessary to increase the core-loss-component current of one of the secondary coils. I do this by placing an auxiliary short-circuited winding of small dimensions upon the same core member that is embraced by the main secondary coil, the core-loss-component current of which it is desired to increase.

The short circuited coil $4a$ is employed for this purpose and embodies such constants that the core-loss components of the currents $4'$ and $5'$ are the same. That is, the in-phase components which I have indicated by $c$ are equal to each other and, therefore, it follows that the exciting currents designated by $e$ are the same, both in value and in position.

Taking $o$ as a reference point from which to plot the currents in the secondary coils, it will be seen that the remaining in-phase components or the power components of the currents $4'$ and $5'$ subtract from each other to provide the current $7'$, which is the current ultimately utilized from the secondary windings of the transformer. The in-phase component of the current $4'$ is made quite small, although it is not possible, of course, to rotate the vector 4 into such position that a zero in-phase component will result.

It will be observed that, inasmuch as the phase angle of the resultant differential currents will be zero with respect to the primary current, any changes in current ratio will effect both secondary coils to the same extent, and, consequently, constant ratio and phase-angle curves will result, eliminating the necessity of continued reference to an auxiliary curve-correction sheet, as the load on the primary winding of the current transformer varies.

While I have shown but one embodiment of my invention, it will be apparent to those skilled in the art that many modifications may be made therein without departing from the spirit and scope of the appended claims.

I claim as my invention:

1. The combination of a plurality of core members, a primary coil and a plurality of secondary coils associated therewith, and electrical means for causing the impedances of the secondary circuits to differ from each other.

2. In a current-transforming device, a plurality of core members, a single primary coil, a plurality of secondary coils related thereto, means for causing currents of different values to flow in said secondary coils whereby the difference between the values of the currents in said secondary coils may be utilized to accurately indicate the value of the current traversing the primary circuit.

3. In a current-transforming device, a plurality of core members of varying magnetic characteristics, a primary coil embracing all of said core members, and a plurality of secondary coils, each of which embraces one of the core members, said secondary coils being connected in opposition.

4. In a current-transforming device, a plurality of core members, a primary coil embracing all of said core members, and a plurality of secondary coils, each of which embraces one of the core members, said secondary coils being connected in opposition, and means for causing equal exciting currents to flow in said secondary coils although the total currents flowing therein are not equal to each other.

5. In a current-transforming device, a plurality of core members, a primary coil embracing all of said core members, and a plurality of secondary coils, each of which embraces one of the core members, said secondary coils being connected in opposition, means for causing equal magnetizing currents to flow in said secondary coils although the total currents flowing therein are not equal to each other, and means whereby the difference of the in-phase currents of the secondary coils is utilized.

6. In a current-transforming device, core members, primary coils and secondary coils associated therewith, the secondary coils being connected in opposition, and means for causing the exciting currents in the secondary coils to have the same value and phase position although the total currents therein differ.

7. In a current-transforming device, core members, primary coils and secondary coils associated therewith, the secondary coils being connected in opposition, means for varying the phase angle of the secondary currents, and means for causing the exciting components of the secondary currents to have the same value and phase position although the total secondary currents differ.

8. In a current-transforming device, core members, primary coils and secondary coils associated therewith, the secondary coils being connected in opposition, and means for causing the phase angles of the secondary currents to differ from each other.

9. In a current-transforming device, core members, primary coils and secondary coils associated therewith, the secondary coils being connected in opposition, and means for causing the reluctances of the magnetic circuits embraced by the secondary coils to differ.

10. In a current-transforming device, core members, primary coils and secondary coils associated therewith, the secondary coils being connected in opposition, and means providing an air gap inserted in one of the core members to vary the phase angle of the current flowing in the secondary coil embracing that core member.

11. In a current-transforming device, core members, primary coils and secondary coils associated therewith, the secondary coils being connected in opposition, means for varying the phase angle of the secondary currents, and means for increasing the core loss component of the current in one of the secondary coils.

12. In a current-transforming device, core members, primary coils and secondary coils associated therewith, the secondary coils being connected in opposition, means comprising an air gap for varying the phase angle of the secondary currents, and means for equalizing the core-loss components of the currents in the secondary coils.

13. In a current-transforming device, core members, primary coils and secondary coils associated therewith, the secondary coils being connected in opposition, means for varying the phase angle of the secondary currents, and means comprising a short circuited auxiliary winding for increasing the core-loss component of the current in one of the secondary coils.

14. In a current-transforming device, core members, primary coils and secondary coils associated therewith, the secondary coils being connected in opposition, means for varying the phase angle of the secondary currents, and means comprising a short circuited auxiliary winding for increasing the core-loss component of the current in one of the secondary coils, said auxiliary winding embracing the same core member as the secondary coil the core-loss component current in which it is desired to increase.

15. In a current-transforming device, core members spaced apart to preclude energy interchange therebetween by leakage, primary coils and secondary coils associated therewith, the secondary coils being connected in opposition, and means for causing the exciting currents in the secondary coils to have the same value and phase position.

In testimony whereof, I have hereunto subscribed my name this 21st day of November, 1919.

LEO DORFMAN.